United States Patent [19]
Pascoe

[11] Patent Number: 5,813,015
[45] Date of Patent: Sep. 22, 1998

[54] METHOD AND APPARATUS FOR INCREASING AVAILABLE STORAGE SPACE ON A COMPUTER SYSTEM BY DISPOSING OF DATA WITH USER DEFINED CHARACTERISTICS

[75] Inventor: Robert A. Pascoe, Grapevine, Tex.

[73] Assignee: International Business Machine Corp., Armonk, N.Y.

[21] Appl. No.: 72,826

[22] Filed: Jun. 7, 1993

[51] Int. Cl.$^6$ .................................................. G06F 17/00
[52] U.S. Cl. ................................. 707/200; 395/349
[58] Field of Search ................................ 395/600, 349; 364/514, 425, 570, 49, 419.17; 707/200

[56] References Cited

U.S. PATENT DOCUMENTS

| | | | |
|---|---|---|---|
| 4,663,736 | 5/1987 | Furusawa et al. | 395/600 |
| 4,899,299 | 2/1990 | MacPail | 364/570 |
| 5,107,419 | 4/1992 | MacPhail | 395/600 |
| 5,140,521 | 8/1992 | Kozol et al. | 364/419.1 |
| 5,287,447 | 2/1994 | Miller et al. | 395/157 |
| 5,377,354 | 12/1994 | Scannell et al. | 395/600 X |
| 5,416,901 | 5/1995 | Torres | 395/159 |

OTHER PUBLICATIONS

Tom Petaccia, "Disktop 4.0," *MacUser*, vol. 6, No. 6, Jun. 1990, pp. 76–79.

Gofer Manual, 1988 by Microlytics, Inc.,pp. 1–22.

*Primary Examiner*—Paul V. Kulik
*Attorney, Agent, or Firm*—A. Bruce Clay

[57] ABSTRACT

A scrubber object may be dropped onto a container object on a computer system. A dialog box is opened which allows a user to select search criteria for the disposal of files/data within the container. After selecting the appropriate search criteria, the present invention will search the container for items meeting the criteria and will then display a list of those items for user approval. The user may then accept all items in the list for disposal, reject all items on the list for disposal, or accept some items and reject some items on the list for disposal.

8 Claims, 3 Drawing Sheets

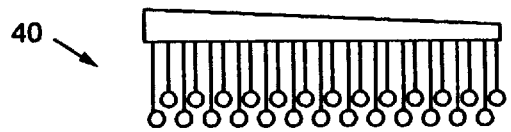

METHOD AND APPARATUS FOR INCREASING AVAILABLE STORAGE SPACE ON A COMPUTER SYSTEM BY DISPOSING OF DATA WITH USER DEFINED CHARACTERISTICS

TECHNICAL FIELD OF THE INVENTION

The present invention relates in general to computer software, and in particular to a method and apparatus for disposal of unwanted/outdated files.

BACKGROUND OF THE INVENTION

Modern computer systems typically have an associated storage device upon which software programs, data, etc., are stored. Since these storage devices have a finite amount of space thereon for the actual storage of information, it is required to "cleanup" the storage device from time-to-time. Cleanup can occur either as a result of the owner of the storage device knowing that some information stored thereon is not needed, or a message provided to the owner stating that there is insufficient space for more information. There are computer programs known in the art which will assist the user/operator with disposal of unwanted/outdated information. Such programs may be either initiated automatically as a result of insufficient storage space or called by the user/operator. It is usually necessary to go through the information on the storage device item-by-item and indicate what is to be removed and what is to be maintained.

With the advent of object oriented systems, drag and drop operations have been combined with cleanup and disposal of unwanted information. For example, a graphical representation of a document shredder or of a garbage can may be used. These objects allow a user/operator to drag an unwanted file to the shredder or garbage can and drop the file thereon. By so doing, the unwanted file is "shredded" or "thrown out". Again, it is necessary to dispose of files/information on an item-by-item basis. While there is a capability to sort items (i.e., such as by the oldest date, subject matter, etc.), it is still necessary, to manually drag and drop each file separately onto the disposal object. Thus there is a need for a method and apparatus that will allow a user/operator to designate groups of information or files for disposal without the requirement to drag and drop each item individually.

SUMMARY OF THE INVENTION

The present invention provides a method and apparatus for disposal/deletion of data from a computer system which substantially eliminates or reduces problems in the prior art. The present invention allows deletion of data from a container on the computer system when the data matches designated criteria.

In accordance with one aspect of the present invention, a method of deleting data from containers on a computer system is provided. A container is first designated for the deletion of data. Then, criteria are defined for the deletion of data in the container. A search is automatically conducted on the data within the container using the defined criteria. The data thus found may then be displayed for editing or approval of deletion. The found data may then be automatically deleted.

It is a technical advantage of the present invention in that item-by-item checking through all the data in a container is no longer required. By the selection/creation of search criteria, all data meeting the criteria may be automatically deleted.

BRIEF DESCRIPTION OF THE DRAWINGS

For a more complete understanding of the present invention and the advantages thereof, reference is now made to the Detailed Description taken in conjunction with the attached Drawings, in which:

FIG. 2 is an example of a graphical representation of the present invention;

FIG. 3 is an illustration of a search criteria dialog box in accordance with the present invention;

FIG. 4 is an illustration of a delete list dialog box in accordance with the present invention.

DETAILED DESCRIPTION OF THE INVENTION

Computers have become more "user friendly" due in part to the advent of object orientation. Objects or "icons" are used to visually represent actions that a user/operator may want to invoke. By selecting the object with a pointer device such as a mouse, the user can initiate the desired action in a much more simple and logical fashion than by typing and entering some obscure command, as required in a non-object oriented system.

Additionally, users have been provided with the ability to group data in "file folder" or "container" objects. Thus, similar data can be placed in the same "container" which is easily accessible to the user with the mouse. However, when the storage space available to the user becomes full (or at some other predefined level), the user must decide on an item-by-item basis what is no longer needed. A container must first be selected and the user has to individually designate each item to be removed or individually drag and drop the item onto a "shredder" or "trash can" object. This can be a time-consuming and inefficient operation, especially if the user has many different containers with many items in each.

It is an objective of the present invention to alleviate the inefficiency of the prior art methods. By utilizing the present invention, a user will be able to designate items to be "scrubbed" from a container object using a predetermined criteria. Each container may thus be "cleansed" of unnecessary data to free up needed storage space for further operation.

Figure 1:
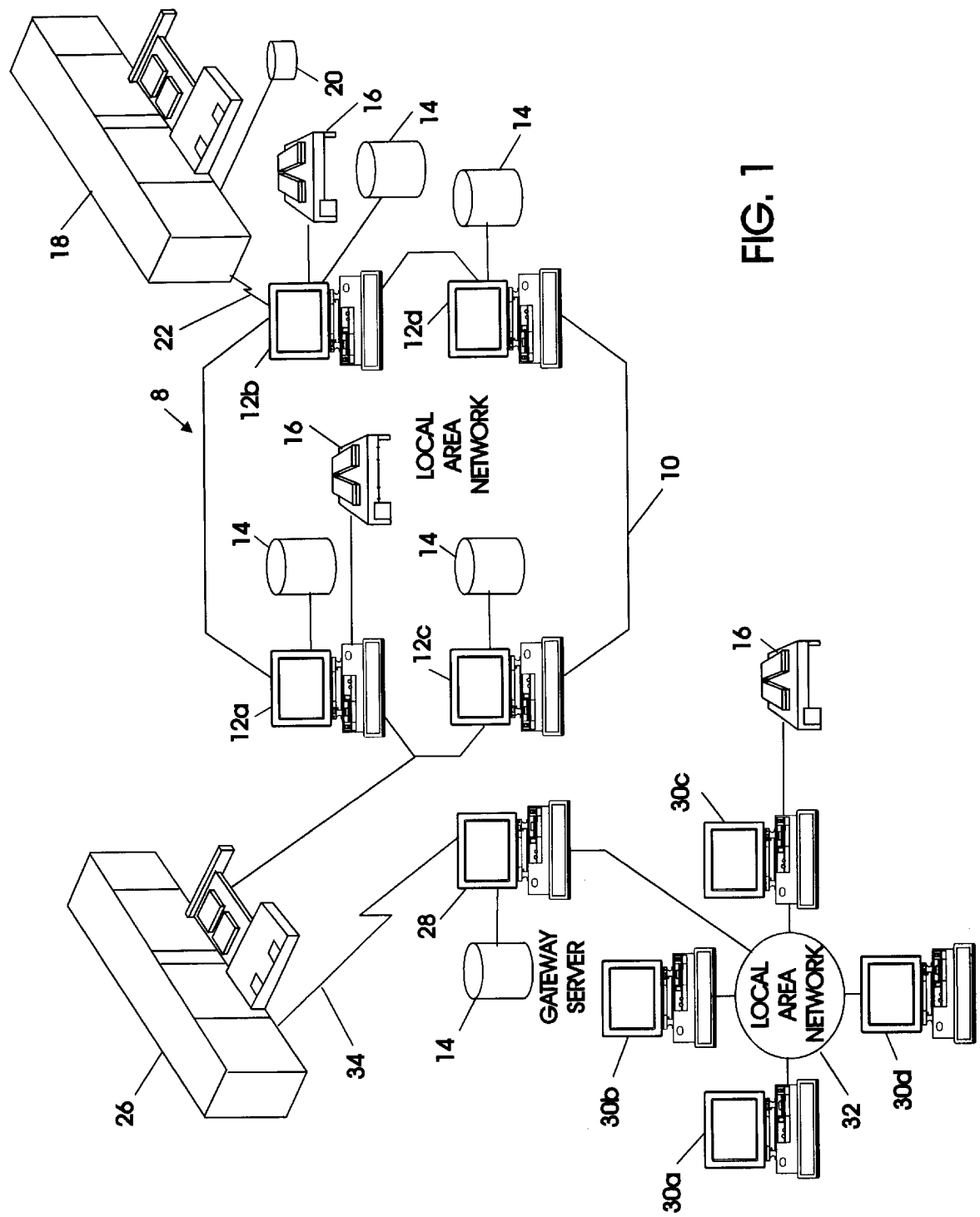
FIG. 1 is a schematic illustration of a data processing system in accordance with the present invention.

Referring to FIG. 1, there is depicted a graphical representation of a data processing system 8, which may be utilized to implement the present invention. As may be seen, the data processing system 8 may include a plurality of networks, such as Local Area Networks (LAN) 10 and 32, each of which preferably includes a plurality of individual computers 12 and 30, respectively. Of course those skilled in the art will appreciate that a plurality of Intelligent Workstations (IWS) coupled to a host processor may be utilized for each such network. As is common in such data processing systems, each individual computer may be coupled to a storage device 14 and/or a printer/output device 16.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and, similarly, LAN 10 may be located a substantial distance from LAN 32. For example, LAN 32 may be located in California, while LAN 10 may be located within Texas, and mainframe computer 18 may be located in New York.

Referring to FIG. 2, an illustration of one possible graphical object representation for use with the present invention is shown. Since the method of the present invention will be used to "scrub" or "cleanse" containers of unwanted data, the use of a scrub brush 40 to depict the action thereof is an appropriate representation.

Referring to FIG. 3, a dialog 50 box which may be opened to scrub a container is shown. By dragging and dropping the scrub brush 40 as shown in FIG. 2 onto a container, the dialog box 50 would be opened. The dialog box 50 allows a user to select and specify criteria for "scrubbing" a file or container object. For example, the dialog box 50 allows a user to select items in the container for disposal by: the name of the author, a created before or created after date, a last updated date, and/or an object size/type. Alternatively, rather than the search categories listed as shown in dialog box 50, a computer implemented dialog could be conducted between the scrub brush 40 and the objects within the container to determine what selection or search criteria may logically exist. This criteria list would then be presented to the user for selection. For example, a mail container object may have attributes of "date mailed", "to", "from", "subject", and etc., which would create logical search criteria.

Once the search categories are selected, the user may select either delete 60, cancel 62, or setup 64. By selecting cancel 62, the scrubbing operation would be terminated (nothing would be disposed of). By selecting delete 60, the container object would be searched using the categories as selected by the user in the dialog box 50. Upon completion of the search, a delete list 70 (see FIG. 4) would be presented to the user. The user would then review the list of "found" items (i.e., items meeting the search criteria selected in dialog box 50) in the delete list 70. The user may modify the delete list 70 by resetting any check boxes 75 associated with each "found" item, thus giving the user final determination as to what items are deleted. The user would then have the option to select cancel 72 or delete 74. By selecting cancel 72, the scrubbing process would be terminated (nothing would be disposed of). By selecting delete 74, the items with check boxes 75 selected in the delete list 70 are deleted from the container object.

Referring again to FIG. 3, by selecting setup 64 after having selected the search categories in the dialog box 50, predetermined criteria will be established for searching the container object upon which the scrub brush 40 was dropped. For example, a scrubber parameters object (such as, for example, a miniature version of the scrub brush 40) could be placed within the container object for use on a recurring basis as initial conditions for subsequent scrubbing of that container object. Obviously, dropping the scrub brush 40 upon the container object containing a scrubber parameters object would open the dialog box 50 with the selected categories already filled in. A user would then be able to modify the search categories or proceed as previously designated.

Figure 5:
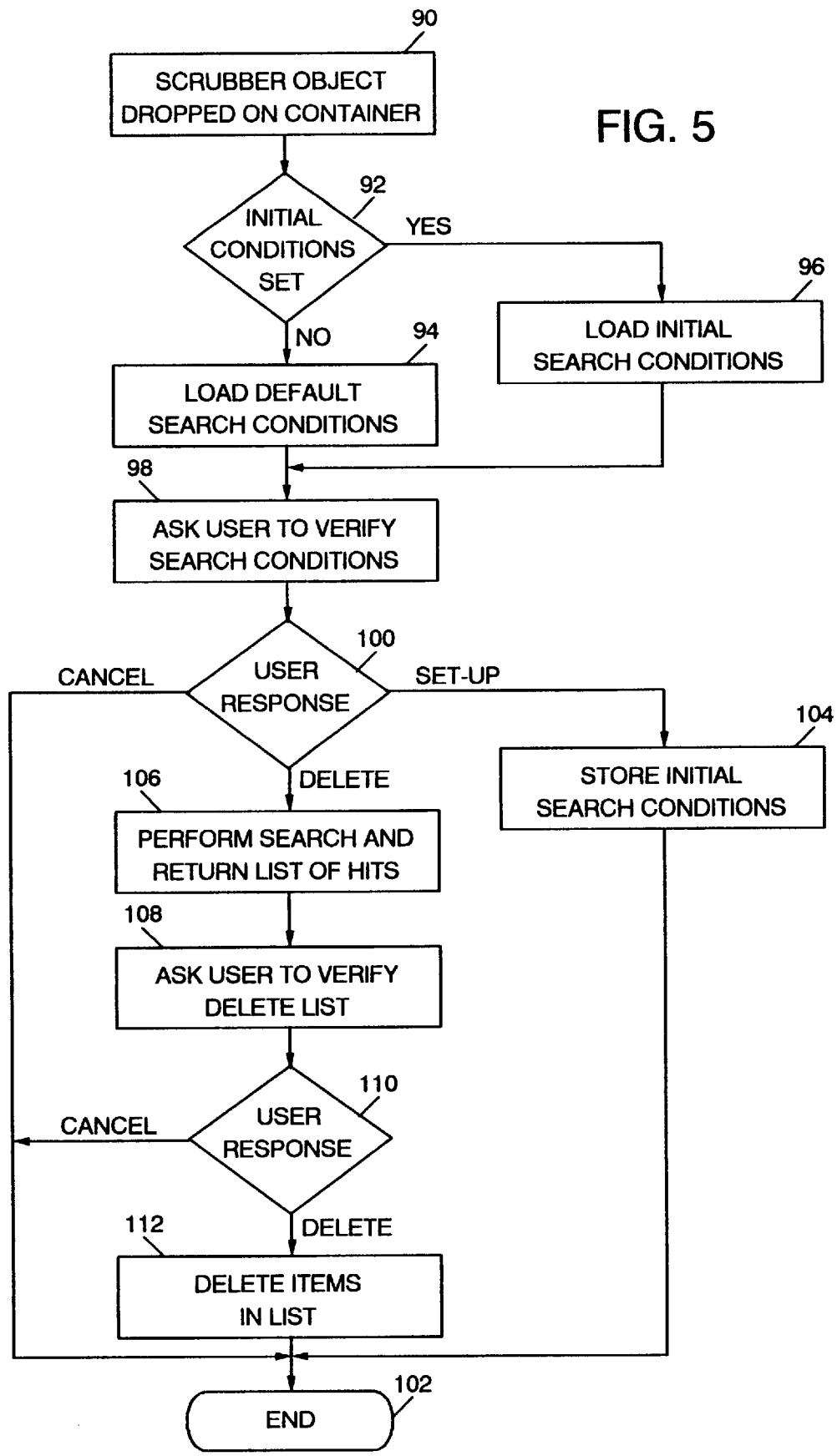
FIG. 5 is a flow diagram of the present invention.

Referring to FIG. 5, a flowchart illustrating the present invention is shown. The scrubber object (scrub brush 40) is dropped on a container object at block 90. It is determined at decision block 92 whether or not initial conditions (scrubber parameters) have been established. Initial conditions (scrubber parameters) are established by selecting setup 64 in the dialog box 50 as previously described above. If the response to decision block 92 is no, default search criteria are loaded for display to the user. The default search conditions are presented to the user as a dialog box such as, for example, the dialog box 50 shown in FIG. 3. If the response to decision block 92 is yes, the initial search conditions (scrubber parameters) are loaded at block 96. Subsequent to block 94 or block 96, the user is asked to verify the search conditions at block 98. It is at this time that the user may select additional and/or alternative search criteria within the dialog box 50. At decision block 100, it is determined whether the response to block 98 is "cancel", "delete", or "setup". If the response to decision block 100 is "cancel", the present invention ends at 102. If the response to decision block 100 is "setup", the initial search conditions (i.e., scrubber parameters) are stored at block 104 followed by termination at 102. If the response to decision block 100 is "delete", a search of the container object is performed using the search categories/criteria designated in dialog box 50 and a return list of hits (a delete list 70 as shown in FIG. 4) occurs and is displayed at block 106. The user is asked to verify that the "found" items in the delete list are to be deleted or not at block 108. It is at this point that the user may modify the delete list by changing the state of the check boxes 75 (as shown in FIG. 4) associated with individual delete list items. The user response is then determined at decision block 110. If the response to decision block 110 is to "cancel" the scrubbing action, the present invention terminates at 102. If the response to decision block 110 is "delete", the items in the delete list 70 are deleted at block 112.

By using the present invention, a user is able to delete unwanted files and/or data without having to go through a list of every item in a container. By establishing criteria for searching the containers, the user may delete unwanted data in accordance with the preselected criteria. Thus, the present invention provides a method and apparatus for efficiently scrubbing or cleansing containers to free up storage space.

Although the present invention has been particularly shown and described with reference to a preferred embodiment, it will be understood by those skilled in the art that various changes in form and detail may be made without departing from the spirit and the scope of the invention.

I claim:

1. A user initiated method of increasing available storage space on a computer system by deletion of data from containers which contain a plurality of documents, comprising the steps of:

selecting a scrubber container displayed on the computer system, said scrubber container having predefined user designated criteria for deletion;

dropping said scrubber container onto at least one other user selected container displayed on the computer system, said at least one other container having stored therein a plurality of documents;

automatically searching each of said documents in said at least one other user selected container using said predefined user designated criteria; and automatically deleting any of said documents matching said predefined user designated criteria.

2. The method of claim 1, wherein said scrubber container having predefined criteria further comprises the step of:

selecting from a predetermined criteria list.

3. A method of claim 1, further comprising the step of:

displaying a list of said any of said documents matching said user designated criteria.

4. The method of claim 3, further comprising the step of:

modifying said list.

5. A system for increasing available storage space on a computer by deletion of data from containers which contain a plurality of documents, comprising:

means for selecting a scrubber container displayed on the computer, said scrubber container having predefined user designated criteria for deletion;

means for dropping said scrubber container onto at least one other user selected container displayed on the computer, said container having stored therein a plurality of documents;

means for automatically searching each of said documents in said container using said predefined user designated criteria; and means for automatically deleting any of said documents matching said predefined user designated criteria.

6. The system of claim 5, wherein said scrubber container having predefined criteria further comprises:

means for selecting from a predetermined criteria list.

7. The system of claim 5, further comprising:

means for displaying a list of said any of said documents matching said user designated criteria.

8. The system of claim 7, further comprising:

means for modifying said list.

\* \* \* \* \*